United States Patent [19]

Anderson et al.

[11] 4,290,141

[45] Sep. 15, 1981

[54] ELECTRONIC VOTING SYSTEM

[75] Inventors: Roy E. Anderson, Scotia; Richard L. Frey, Schenectady; James R. Lewis, Albany, all of N.Y.

[73] Assignee: General Electric Company, Schenectady, N.Y.

[21] Appl. No.: 53,767

[22] Filed: Jul. 2, 1979

[51] Int. Cl.[3] ........................ H04B 17/00; H04J 3/14; G09B 7/06

[52] U.S. Cl. ...................................... 455/2; 179/2 AS; 235/92 AC; 340/147 R; 358/84; 434/351

[58] Field of Search ........................ 455/2; 179/2 AS; 358/84, 185; 235/386, 92 AC, 92 ST, 52, 54 F; 340/147 R, 171 R; 346/33 R; 35/9 R, 9 B, 9 C; 434/350, 351

[56] References Cited

U.S. PATENT DOCUMENTS 3,058,065 10/1962 Freeman et al. ...................... 358/84
3,318,517 5/1967 Wells ...................................... 455/2
3,546,791 12/1970 Koos et al. ........................... 35/9 B
3,947,669 3/1976 Simmons et al. ..................... 235/52

FOREIGN PATENT DOCUMENTS 1536414 12/1978 United Kingdom ................. 358/84

*Primary Examiner*—Marc E. Bookbinder
*Attorney, Agent, or Firm*—Geoffrey H. Krauss; James C. Davis; Marvin Snyder

[57] ABSTRACT

An electronic voting system includes a plurality of wireless response units, each response unit capable of transmitting several different digitally coded signals. Each of these digitally coded signals corresponds to the response of a person responding to a given stimulus. Each response unit transmits a selected digitally coded response via a radio frequency signal during one of a series of time intervals, a different time interval corresponding to each of the response units. An interrogating and response processing unit signals the response units to commence response transmission and receives, processes and displays the transmitted responses for observation by selected persons.

19 Claims, 9 Drawing Figures

10

70
50
DISPLAY 300
ACTIVATE
261
290
CONTROLLER
STOP
START
MEMORY
260
262
250
COUNTER
CLEAR
CARRY
240
280A
280B
280C
280D
280E
270 A
270 B
270 C
270 D
270 E
63A
63B
63C
63D
63E
CLEAR
DIVIDER
÷ 10
230
A
B
C
D
E
CORRELATOR
61
71
OSCILLATOR (SECOND DATA RATE)
220
210
PA
60
AUDIO OUTPUT SELECTOR
37
RF RECEIVER
47
57
59
69
46
200

ELECTRONIC VOTING SYSTEM

BACKGROUND OF THE INVENTION

This invention relates to electronic voting systems, and more particularly to wireless electronic voting systems wherein the voting person is supplied with a hand held response unit such that the voting system is relatively portable.

DESCRIPTION OF THE PRIOR ART

Situations often arise in which it is desirable to pose a question to an assembled group of people and determine their collective response thereto. In the past, voting systems have been developed to accomplish this end. However, such systems typically rely on vote registration units located at various fixed points in proximity to the location where the voting takes place. Such vote registration units are typically connected to a central tallying apparatus via hard wire lines. Thus, the voting person is constrained to remain at the location where his particular vote registration unit is situated. This type of vote registration system is inherently nonportable.

An electronic audience polling system which exhibits the advantage of general portability is described and claimed in our U.S. patent application Ser. No. 971,703, filed Dec. 21, 1978 and assigned to the instant assignee. That system includes a plurality of wireless transmitters, each capable of transmitting a pulse of electromagnetic energy on a selected one of a group of predetermined frequencies. Each frequency selected on which to transmit corresponds to one of a group of suggested responses to a given stimulus. One embodiment of such polling system includes a receiver for receiving the transmitted pulses and electronic counters for tallying the number of pulses received on each of the selected frequencies. An electronic display presents the results of the tallying for observation. To decrease the probability that two transmitted pulses overlap in time, causing the two pulses to be counted as a single pulse, thus producing an error in the count, the polling system includes a time delay circuit incorporated in each response transmitting unit such that the time of pulse transmission as measured from the time of actuation of the transmitting unit by the polled person, varies by a randomly selected but fixed, different amount of time for each response transmitting unit. Although the probability of pulse overlap is resultingly very small, some overlap may still occur, undesirably causing the loss of polling pulse information and thus a small degree of error.

The present invention concerns an electronic voting system which avoids the problem of polling pulse overlap. As a result, an extremely accurate representation of the voter-selected responses is achieved while maintaining system flexibility and portability.

It is one object of the invention to provide an electronic voting system in which the individual wireless response communicating units are portable, that is, not secured to fixed locations. Similarly, the overall electronic voting system is desirably portable.

It is another object of the invention to provide an electronic voting system wherein the vote response information is collected and processed with high accuracy.

These and other objects of the invention will become apparent to those skilled in the art upon consideration of the following description of the invention.

BRIEF SUMMARY OF THE INVENTION

The present invention is directed to increasing the accuracy of electronic voting systems.

In accordance with one preferred embodiment of the invention, an electronic voting system for determining the selection of suggested responses made by a group of people to a given stimulus includes a plurality of response communicating units. One response unit is provided to each person desiring to vote. Each response unit is capable of generating any one of a plurality of distinct digitally coded signals and modulating such signal on an electromagnetic carrier wave of predetermined frequency. Each of the digitally coded signals corresponds to a different one of the suggested answers which the voting persons may select. Each response unit is adapted to receive an electromagnetic synchronization signal and respectively transmit the voter selected digitally coded response signal during a different one of a plurality of sequential time intervals of predetermined duration. Thus, a different time interval corresponds to each response unit. Each time interval commences after a different selected amount of time has elapsed from the time of reception of the synchronization signal by each respective response unit.

The electronic voting system includes a synchronization signal transmitter for transmitting the synchronization signal modulated on an electromagnetic carrier wave of predetermined frequency. A receiver receives the digitally coded response signals transmitted by the response units and includes demodulating means for demodulating these digitally coded signals from said electromagnetic carrier wave. A correlator is operatively coupled to the receiver to correlate the received digitally coded signals with the suggested responses corresponding thereto. The correlator includes a plurality of logic outputs, each logic output respectively corresponding to one of the plurality of digitally coded signals. Each logic output respectively provides a logic signal each time one of the digitally coded signals is received which corresponds to that respective output. The electronic voting system includes a plurality of counters for totalling the number of logic signals generated at each of the logic outputs. Each counter is respectively responsive to a separate one of the logic outputs. An electronic display is operatively coupled to the counters to display data representative of the total number of logic signals counted by each of the counters such that the number of each of the suggested responses selected by the audience may be ascertained.

An alternative preferred embodiment of the electronic voting system includes an electronic processor responsive to the correlator and operatively connected thereto. The electronic processor provides display signals representative of the number of logic signals generated at each of the logic outputs of the correlator. In such embodiment, the counters which count such logic signals are operatively coupled to the electronic processor and the correlator or, in lieu thereof, the counting function is performed by the electronic processor. The electronic display is coupled to the electronic processor.

Another alternative embodiment of the invention includes a plurality of response communicating units, each of which is capable of generating digital signals representative of a voter-conceived multi-character alphanumeric response. As in the above described embodiments, the digitally coded responses are respectively transmitted by each response communicating unit at different time intervals of predetermined duration.

The features of the invention believed to be novel are set forth with particularity in the appended claims. The invention itself, however, both as to organization and method of operation, together with further objects and advantages thereof, may best be understood by reference to the following description taken in conjunction with the accompanying drawings.

DETAILED DESCRIPTION OF THE PREFERRED EMBODIMENT

Figure 1A:
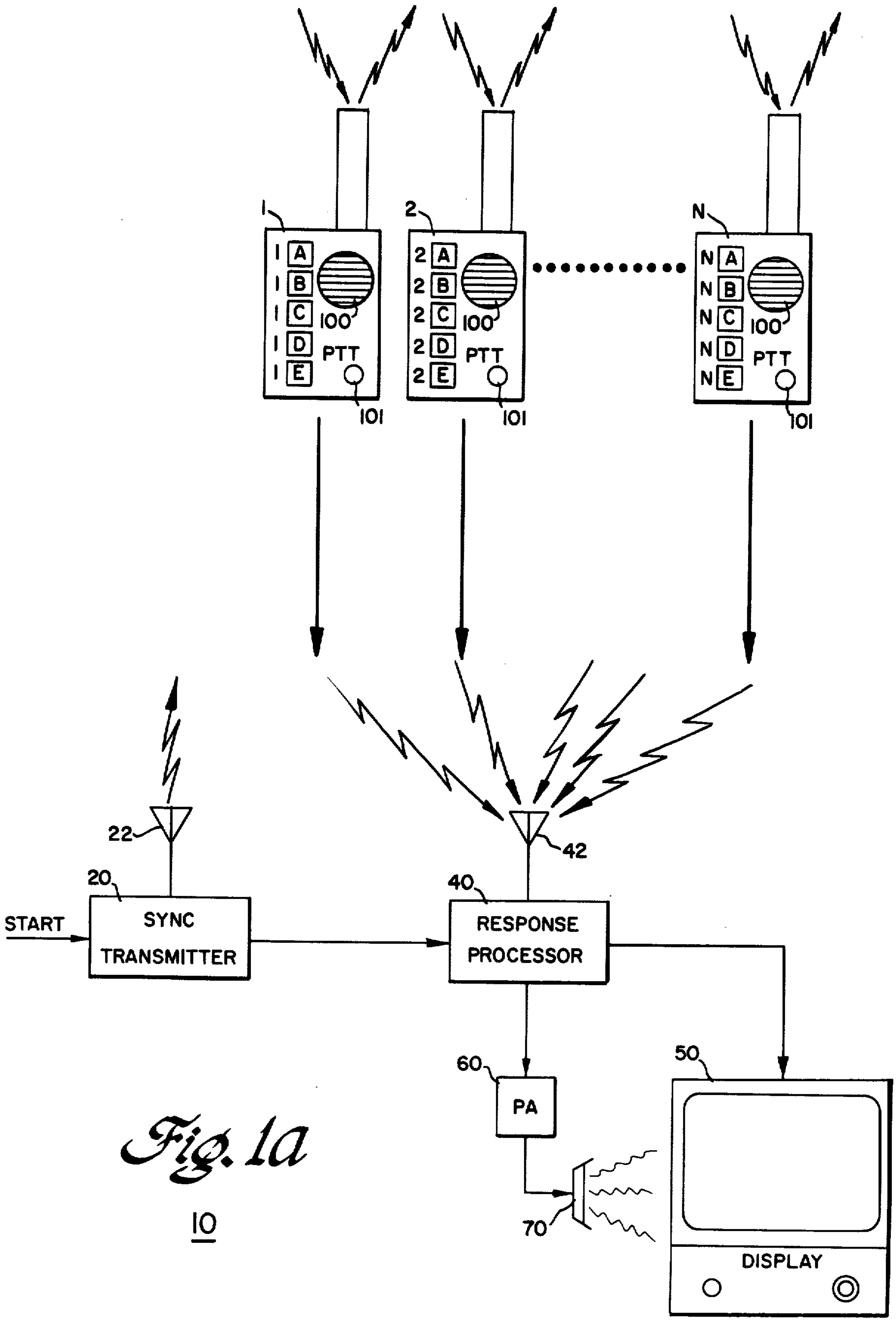
FIG. 1*a* is a block diagram of one preferred embodiment of the electronic voting system of the present invention.

FIG. 1*a* illustrates an electronic voting system 10. System 10 includes a plurality of response communicating units conveniently designated as units 1, 2, . . . N, with N signifying the number of persons that will vote. A response communicating unit is provided to each of such voting persons.

A question with a plurality of suggested answers is presented to the voting persons. For example, the suggested responses may be A-strongly agree, B-agree, C-undecided, D-disagree and E-strongly disagree. Each voting person registers his response on his response communicator. For example, the voting person possessing response communicator 1 actuates one of a plurality of switches 1A, 1B, 1C, 1D and 1E included in his response communicating unit to indicate his response selection. Each of switches 1A–1E respectively corresponds to one of the suggested answers. Of course, a greater or lesser number of such voter actuable switches may be provided in the response unit according to the number of different suggested responses desired. The response selection made by each voter is stored for later transmission in each respective response communicating unit in a manner that will be discussed later in greater detail.

Electronic voting system 10 includes a synchronization signal transmitter 20 coupled to an antenna 22 for transmitting a digitally coded synchronization signal modulated on an electromagnetic wave of predetermined carrier frequency. After the voters have registered their responses on their respective response communicating units, the person conducting the voting (a master of ceremonies, for example) actuates synchronization signal transmitter 20 causing the digitally coded synchronization signal to be transmitted to response communicating unit 1, 2 . . . N. Response communicators 1, 2, . . . N are generally situated in relatively close proximity to transmitter 20.

Response communicating units 1, 2, . . . N are each capable of generating any one of a plurality of distinct digitally coded signals, a different digitally coded signal being generated according to which one of switches A through E is activated on the respective response communicating unit. Each response communicating unit includes a receiver (not shown) capable of receiving the synchronization signal transmitted by synchronization transmitter 20. After reception of the synchronization signal, each response communicating unit transmits a digitalized response, that is, a digitally coded signal corresponding to the particular suggested response selected by the user of each respective unit.

Figure 1B:
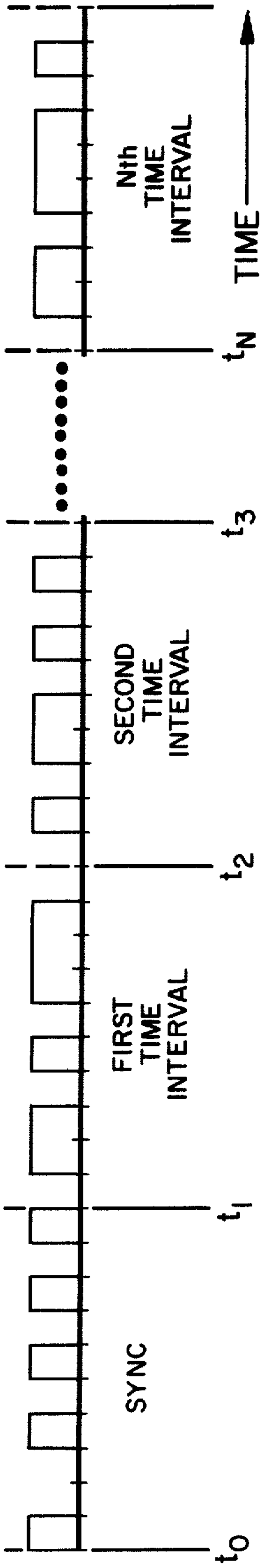
FIG. 1*b* is a time line graph showing the time intervals during which the response units respectively transmit digitalized responses.

The digitalized responses of the response communicating units are respectively transmitted during different time intervals for each of the response units. A time line graph is shown in FIG. 1*b* to illustrate that each of response communicating units 1, 2, . . . N transmits a digitalized response during the particular time interval assigned to it. Initially, synchronization signal transmitter 20 transmits the synchronization signal between times $t_0$ and $t_1$. Response unit 1 transmits a voter selected digitalized response signal during the timer interval $t_1$ to $t_2$. Response unit 2 transmits a voter selected digitalized response during time interval $t_2$ to $t_3$ and so forth up to unit N. Each response communicating unit 1, 2, . . . N transmits the voter selected digitalized response signal modulated on an electromagnetic carrier wave of predetermined frequency. To conserve valuable frequency spectrum, the response units transmit on the same frequency.

Electronic voting system 10 includes a response processor 40 conveniently situated near synchronization signal transmitter 20 and in relatively close proximity to the response communicating units. Response processor 40 receives the digitalized response signals transmitted by response units 1, 2, . . . N and demodulates these digitally coded signals. Processor 40 correlates the received digitalized response signals to the suggested responses they represent and provides signal information representing the number of each of the selected responses chosen to a display 50. In some embodiments of the invention, response processor 40 not only counts the number of each of the suggested responses chosen, but also stores data indicating the suggested response selected by the user of each of response communicating units 1, 2, . . . N. Signal information representing this data is provided to display 50 such that the manner in which the user of each response communicating unit voted may be determined by selected observers.

In the embodiment of the invention shown in FIG. 1*a*, each response communicating unit includes a wireless microphone 100 actuated by a push-to-talk switch 101 or other actuating device such that a voting person may address the other voters and the person or persons conducting the voting. The wireless microphone portions of response communicators 1 through N transmit the voter's voice signal modulated on an electromagnetic wave of carrier frequency preferably, although not necessarily, different from that on which the digitally coded response signals are transmitted. However, such voice signal carrier frequency is conveniently sufficiently close to the frequency on which the digitally coded response signals are transmitted such that the same transmitting antenna may be utilized for both. The voice modulated signals transmitted by a response communicating unit are received and demodulated by response processor 40. Response processor 40 provides the demodulated voice signal to public address amplifier 60 operatively coupled thereto. Public address amplifier 60 is connected to a loudspeaker 70 such that the comments of the voting person may be heard.

Figure 2:
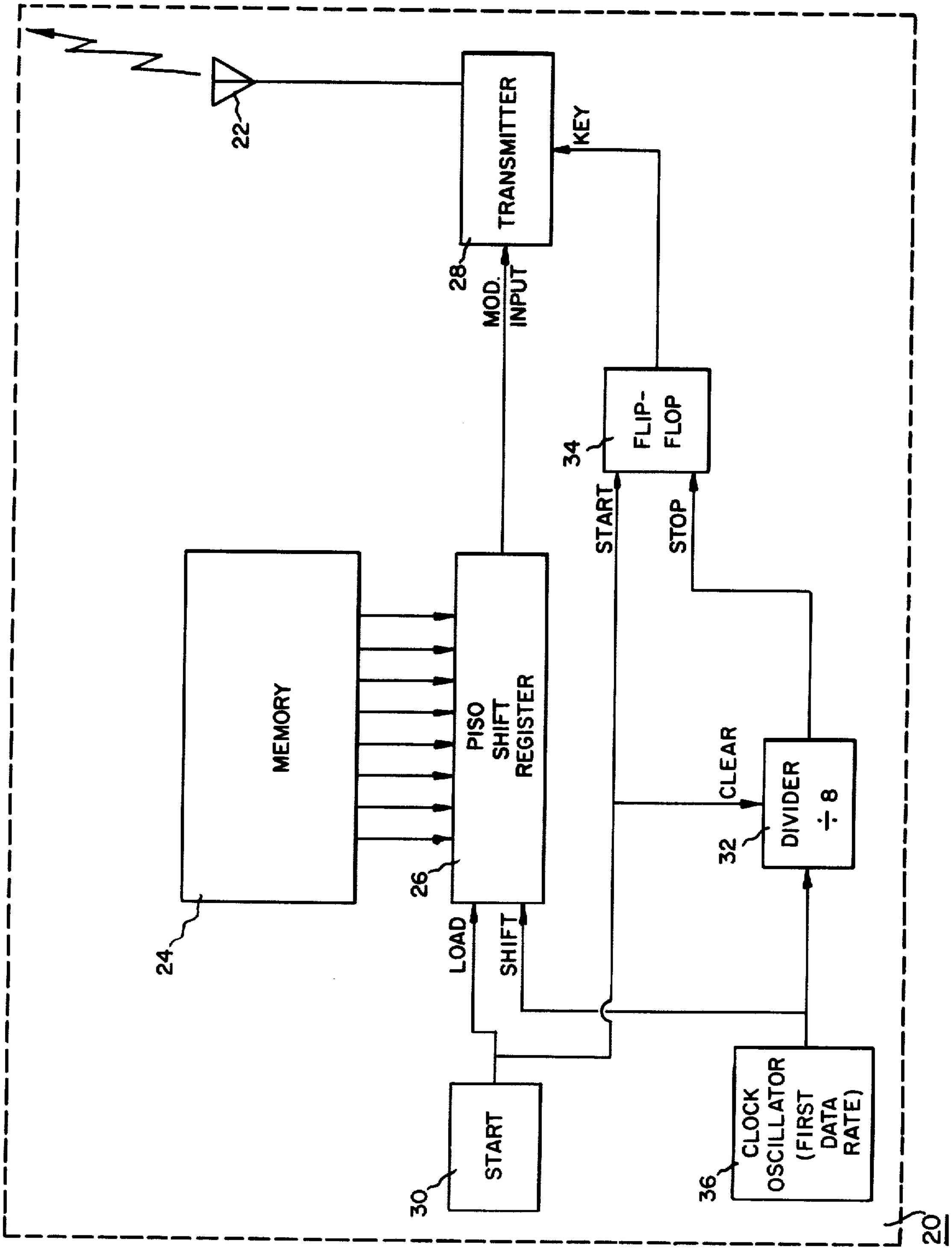
FIG. 2 is a detailed block diagram of the synchronization signal transmitter shown in FIG. 1.

FIG. 2 shows a synchronization transmitter 20 which is typically employed in electronic voting system 10 of FIG. 1. Synchronization transmitter 20 transmits an eight bit digitally coded signal (or word) modulated on an electromagnetic carrier wave of predetermined frequency. Synchronization transmitters which generate synchronization words of more or less than eight bits are also acceptable for implementing transmitter 20.

Synchronization transmitter 20 includes a 1 by 8 bit memory 24. Memory 24 stores the particular synchronization word to be transmitted by synchronization transmitter 20. Memory 24 typically comprises a diode matrix or read only memory programmed with the particular combination of zeroes and ones comprising the desired 8 bit synchronization word. Memory 24 is operatively coupled to the input port of a parallel-in-serial-out shift register 26. Shift register 26 includes load, shift and output terminals. The output terminal of shift register 26 is coupled to the modulation input of a transmitter 28. Transmitter 28 includes a key terminal, which upon application of an appropriate signal thereto, causes transmitter 28 to be turned on and transmit signals present on the modulation input terminal thereof. The output of transmitter 28 is coupled to an antenna 22. Synchronization transmitter 20 includes a start response transmission switch 30 coupled to the load terminal of shift register 26, to the clear terminal of a divider 32 and to the start terminal of a flip-flop circuit 34. Divider 32 comprises a divide-by-eight divider circuit commercially available from many manufacturers. Flip-flop 34 includes start, stop, and output terminals and is readily commercially available. Synchronization signal transmitter 20 includes an oscillator 36 which provides an output signal of frequency equal to that of the desired first data rate. The output of oscillator 36 is coupled to the shift terminal of shift register 26 and to the input of divider 32. The output of divider 32 is coupled to the stop terminal of flip-flop 34.

The person conducting the voting actuates switch 30 causing the synchronization word (or sync word) stored in memory 24 to be loaded into shift register 26. The sync word thus loaded into shift register 26 is shifted serially at the first data rate determined by oscillator 36 into the modulation input of transmitter 28. Actuating switch 30 causes flip-flop 34 to change its logic output voltage state in a manner causing transmitter 28 to be turned on and transmit the sync word supplied to the modulation input thereof. Actuating switch 30 causes divider 32 to be cleared and start dividing the first data rate received from oscillator 36 by the quantity eight. Thus, after divider 32 has received eight pulses from oscillator 36, divider 32 generates a pulse at its output which is supplied to the stop terminal of flip-flop 34 causing the logic output voltage state of the flip-flop 34 to be changed in a manner causing transmitter 32 to be turned off. Thus, upon completion of transmission of the eight bit synchronization word, transmitter 28 is turned off.

Figure 3:
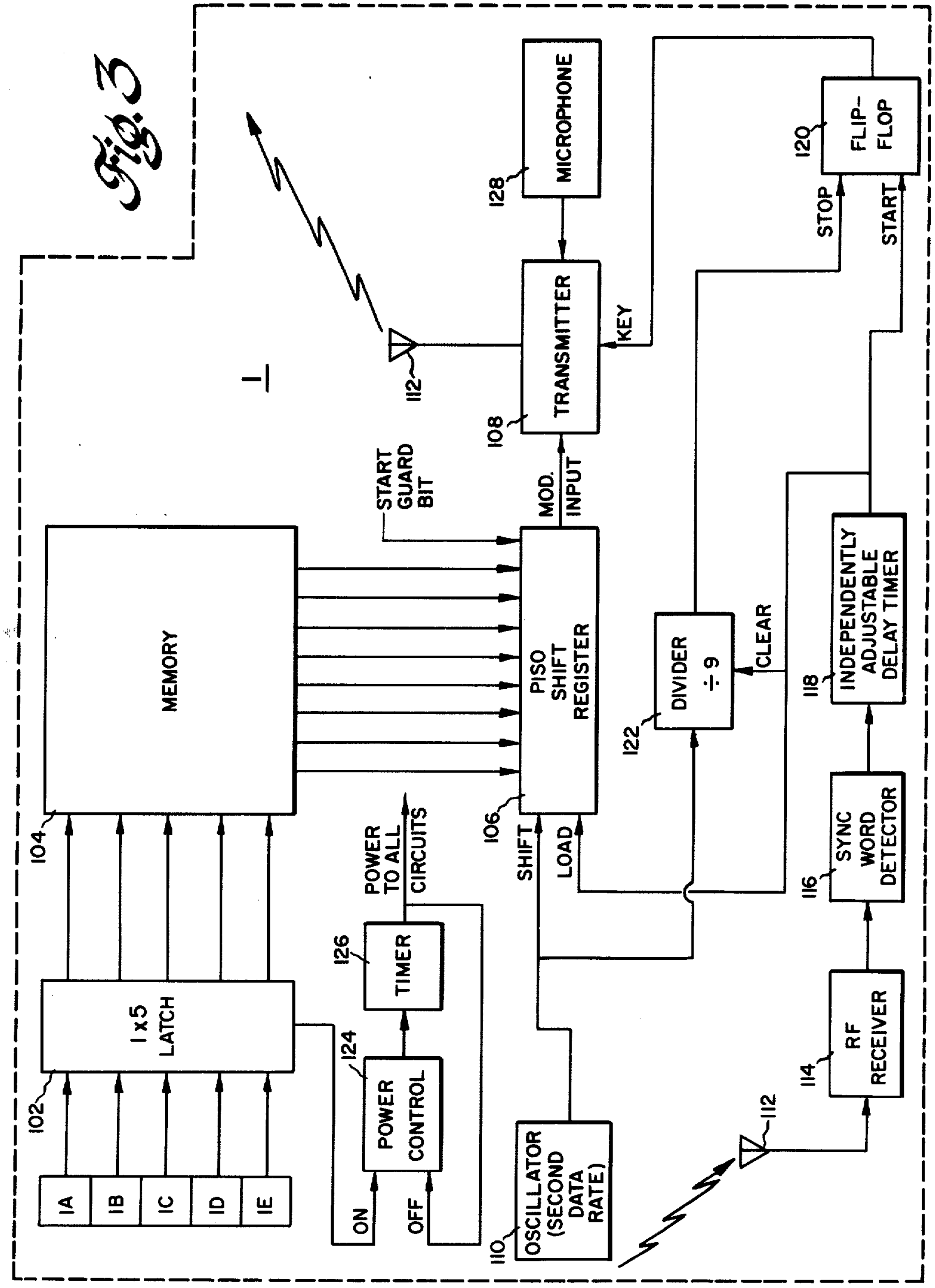
FIG. 3 is a detailed block diagram of one of the hand held response communicating units of the electronic voting system shown in FIG. 1.

FIG. 3 shows a typical one of the response communicating units 1 through N. Response unit 1 includes a bank of user actuable switches, for example five, designated 1A, 1B, 1C, 1D and 1E. Each of switches 1A through 1E is respectively coupled to one of the five inputs of a 1×5 latching circuit 102. Latching circuit 102 is readily commercially available in integrated circuit form or easily fabricated in a discrete manner. Latching circuit 102 includes five outputs, each of which is respectively connected to a corresponding input of a five by eight memory 104. Memory 104 typically comprises a diode matrix or a read only memory. Memory 104 stores five different eight bit digitally coded patterns, each pattern corresponding respectively to one of the suggested responses. The output of memory 104 is supplied to the input port of a parallel-in-serial-out shift register 106 as shown. Shift register 106 includes shift, load and output terminals. The output terminal of shift register 106 is coupled to the modulation input of a radio frequency transmitter 108. An oscillator 110 produces an output signal of frequency equal to a second data rate. The output of oscillator 110 is coupled to the shift terminal of shift register 106.

Response communicator 1 includes an antenna 112 operatively coupled to the output of transmitter 108 and operatively coupled to the input of a radio frequency (RF) receiver 114. (For convenience, antenna 112 is shown as two antennas.) The input of receiver 114 is tuned to the predetermined frequency on which synchronization transmitter 20 transmits the digitally coded synchronization signal. Receiver 114 receives the synchronization signal and generates a demodulated synchronization signal at its output. The output of receiver 114 is coupled to the input of synchronization word detector 116. Synchronization word detector 116 produces a logic pulse at its output upon injection of the particular synchronization signal bit pattern generated by synchronization transmitter 20 into the input of detector 116. Synchronization word detector 116 is nonresponsive to other bit patterns and noise. The output of detector 116 is coupled to the input of independently adjustable delay timer 118. Delay timer 118 produces a logic pulse at its output after a selected amount of time has transpired from injection of a logic pulse signal into its input. The delay time of timer 118 is sufficiently long such that it produces a logic pulse at its output at the beginning of the particular time interval corresponding to response communicator 1. Similarly, the delay timers 118 in response units 2 through N produce logic pulses at their respective outputs after different selected amounts of time have transpired from reception of the synchronization signal. In each of such response communicating units 2 through N, the logic pulse at the output of the independently adjustable delay timer occurs at the beginning of the respective response time interval associated with that particular response communicating unit.

Response communicating unit 1 includes a flip-flop circuit 120 having stop, start, and output terminals. The output of delay timer 118 is coupled to the start terminal of flip-flop 120. The output of flip-flop 120 is coupled to a key input of transmitter 108 in a manner causing transmitter 108 to be turned on by an appropriate change of logic voltage state at the output terminal of flip-flop 120. A frequency dividing circuit 122 is connected between the output of oscillator 110 and the stop terminal of flip-flop 120. Divider 122 is typically a divide-by-nine circuit of the type well known in the art. A clear or reset terminal is included in a divider 122 to set the output of divider 122 to a desired initial state. The output of delay timer 118 is coupled to the clear terminal of divider 122 and to the load terminal of shift register 106.

Response communicator 1 includes a power control circuit 124 coupled to a timer 126 which together act to reduce power consumption of response communicator 1. Power control circuit 124 typically comprises, for example, a battery (not shown) and a switching transistor (not shown) operatively coupled together and to latching circuit 102 such that when one of latches 102 is activated by a voter actuating one of switches 1A through 1E, battery power is provided to the remainder of the various circuits of response communicator 1 to meet their respective power supply requirements. Such battery power is continually supplied to latch 102 which is typically of the CMOS variety which consumes extremely small quantities of power. Since power is continually supplied to latch 102, response communicating unit 1 stands ready at all times to be actuated by a voter. A timer 126 is operatively coupled to power control 124 such that after a predetermined amount of time, for example, 20 seconds, the switching transistor of power control 124 is turned off, thus removing power from the remainder of the circuitry of response communicator 1 except for latch 102.

Response communicating units 2 through N are identical to response communicator 1 described above except that each of the independently adjustable delay timers 118 of response units 2 . . . N have a different time delay as compared to the time delay of timer 118 of response unit 1. Thus, each of response communicators 1 through N is capable of transmitting a digitalized response signal during a different time interval. The durations of such time intervals are equal and fixed for response units 1 . . . N in this embodiment of the electronic voting system. Typically, the time duration of the time intervals is 100 microseconds which provides sufficient time for a first guard bit (a logic zero), 8 bits of digitalized response information and a second guard bit (a logic zero). For such electronic voting system the time delay provided by time delay circuit 118 of response unit 1 is zero microseconds. The time delays provided by the time delay circuits of response units 2 and 3 are respectively 100 and 200 microseconds, and so forth with an increase in time delay of 100 microseconds per response unit up to the Nth unit. Other embodiments of the invention may employ time intervals of greater or lesser duration than 100 microseconds according to the number of bits of digitalized response information to be transmitted per time interval and according to the data rate selected for such transmission.

Response communicating unit 1 includes a microphone 128 operatively coupled to transmitter 108. Microphone 128 includes a push-to-talk switch (not shown) such that a voter may transmit a voice comment to the rest of the voters and to the master of ceremonies. Microphone 128 preferably actuates transmitter 108 to transmit a voice signal on a frequency different from that on which the digitalized response signals are transmitted. Such voice signal may be transmitted on the same frequency as the digitalized reponse signals providing the voice signal and the digital response signals are transmitted at different times. Interference between the digitalized response signals and the voice signals is thus avoided.

To promote better understanding of the functioning of response communicating units 1 through N, a brief explanation of the functioning of the circuits of a typical response unit is given below. A question is posed to a group of voters. The voter possessing response communicator number 1 mentally selects a suggested answer, C for example, and actuates switch 1C of response communicator 1 to signify such selection. By actuating switch 1C, latch 102C is triggered to a latched state, that is, a logic high is generated and remains at the output of latch 102*c*. Activation of latch 102 causes power control 124 to supply power to the remaining circuits of response communicator 1, thus enabling them to function for the subsequent 20 second period as determined by timer 126. At some time during this 20 second period allowed for voting, the person conducting the voting actuates synchronization signal transmitter 20 causing a synchronization signal to be transmitted to response communicating units 1 through N. Such synchronization signal travels to antenna 112 and is received by receiver 114. Synchronization word detector 116 detects the presence of the particular synchronization word transmitted by synchronization transmitter 20 and upon such detection provides a logic pulse to independently adjustable delay timer 118. After an appropriate time delay, timer 118 issues a logic pulse to flip-flop 120 causing it to change output logic voltage state and turn transmitter 108 on at the beginning of the response time interval associated with the particular response commuicator 1. Such logic pulse issued by timer 118 after the appropriate delay causes the particular 8 bit word in memory 104 selected by activating latch C to be loaded into shift register 106. The eight bit word so loaded is shifted from register 106 into the modulation input of transmitter 108 at the second data rate determined by oscillator 110. As this eight bit word is shifted into transmitter 108, it is transmitted thereby. After transmission of the selected eight bit data word is completed, response communicator 1 terminates transmission. To accomplish this termination, the output signal of oscillator 110 at the second data rate is divided by 9 by divider 122 causing a logic pulse signal to be provided to the stop terminal of flip-flop 120 after the time for transmission of nine bits of information has transpired. (In this embodiment, although the actual length of the selected data word to be transmitted is eight bits, a guard bit of zero magnitude is provided before and after the selected eight bit data word. (See FIG. 1). Thus, a divide by nine divider 122 is conveniently used in response communicator 1. It is not necessary for the transmitter to be keyed on during the 10th bit (that is, the last guard bit).) Therefore, divider 122 counts just nine pulses from oscillator 110 and then generates a logic pulse which changes the output state of flip-flop circuit 120 causing transmitter 112 to be turned off during the period of time allowed for the last guard bit of the time interval for response communicating unit 1.

All of response communicating units 1 through N respond in a manner similar to that described above during the time intervals associated respectively therewith before 20 seconds has elapsed from the time one of switches A through E is selected on the respective response communicating unit.

Figure 4:
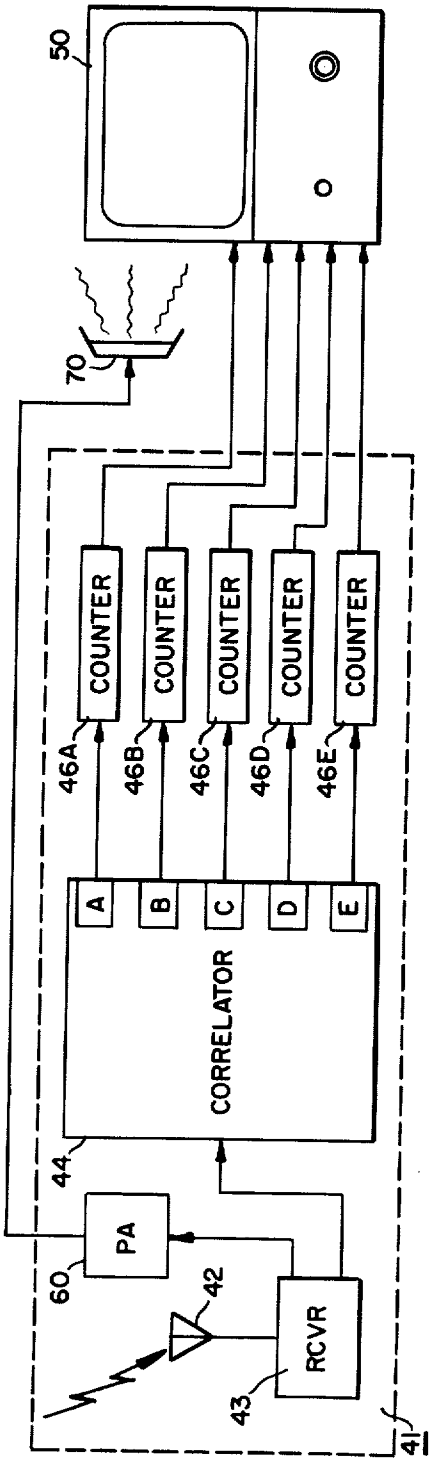
FIG. 4 is a detailed block diagram of the response processor of the electronic voting system shown in FIG. 1.

One response processor which may be employed as response processor 41 in the system of FIG. 1*a* is shown in FIG. 4. Response processor 41 includes a radio frequency receiver 43 coupled to a receiving antenna 42 of suitable size and dimensions for receiving the digitally coded signals transmitted by response units 1 through N. The input of receiver 43 is tuned to the frequency on which such digitalized response signals are transmitted. The output of receiver 43 is coupled to the input of correlator 44. Correlator 44 includes a plurality of logic outputs 44A, 44B, 44C, 44D and 44E. Each of these logic outputs corresponds to a respective one of the five types of digitalized reponse signals that response communicating units 1 through N are capable of transmitting. Each of logic outputs 44A through 44E produces a logic output signal (that is, a voltage high or digital one) when the particular eight bit digital response signal corresponding to that respective logic output is received at the input of correlator 44.

Response processor 41 includes a plurality of counters 46A, 46B, 46C, 46D and 46E. The inputs of counters 46A through 46E are connected respectively to the logic outputs 44A through 44E of correlator 44. Counters 46A through 46E count the total number of logic signals received at their respective inputs and produce display signals on their respective outputs indicative of the counted total of logic signals received by each respective counter. The outputs of counters 46A through 46E are operatively coupled to a display 50 such that the number of votes cast for each of the suggested responses may be ascertained by selected persons.

One output of receiver 43 is coupled to public address amplifier 60, the output of which is coupled to a loudspeaker 70, such that voice comments made by one of the voters may be ascertained by the other voters. Receiver 43 provides audio output for voice signals received on the same frequency as the digitally coded signals are transmitted, although receiver 43 may provide such audio output for voice signals on an alternate frequency if transmission of voice signals on such alternate frequency is desired to avoid potential interference problems as already discussed.

Figure 5:
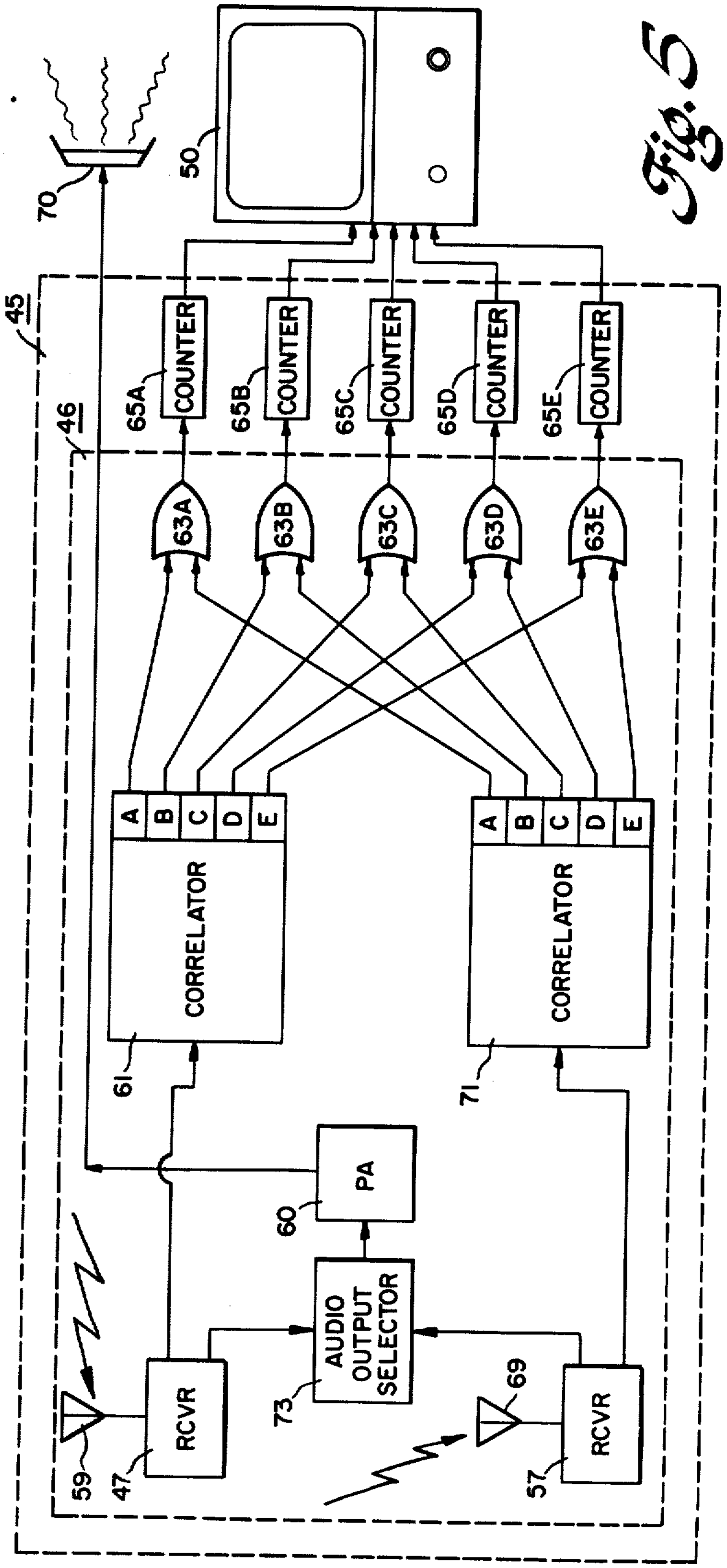
FIG. 5 is a detailed block diagram of an alternative response processor for such electronic voting system.

FIG. 5 shows an alterative response processor 45 which may be employed as response processor 40. Response processor 45 avoids the problem of multipath reception of the signals generated by the response communicators 1 through N by employing a space diversity receiver configuration 46. Response processor 45 includes receivers 47 and 57, at least one of which is likely to receive a strong radio frequency signal from a response communicating unit during each response time interval. The inputs of receivers 47 and 57 are respectively coupled to antennas 59 and 69. The inputs of receivers 47 and 57 are each tuned to the radio frequency on which the digitalized response signals are transmitted by the response communicating units. The outputs of receivers 47 and 57 are respectively coupled to the inputs of correlators 61 and 71. Correlators 61 and 71 are essentially identical to correlator 44 described above in the FIG. 4 discussion. Correlators 61 and 71 respectively include five logic outputs each 61A through 61E and 71A through 71E. Response processor 45 includes five two-input OR gates 63A through 63E. The inputs of each of OR gates 63A through 63E are respectively coupled to the logic outputs of correlators 61 and 71 corresponding to the letter associated with each OR gate. For example, one input of OR gate 63A is coupled to logic output 61A and the remaining input of OR gate 63A is coupled to logic output 71A, and so forth. The output of OR gates 63A through 63E are respectively coupled to the inputs of the five counters 65A through 65E, the outputs of which are coupled to a display 67.

Response processor 45 functions as follows. Digitalized response signals transmitted by response units 1 through N are received by receivers 47 and 57. The response signal reaching at least one of these receivers is likely to have a usable signal level because of the different locations of antennae 59 and 69. That is, if one antenna is situated in a null, the remaining antenna is likely situated in a location where the digitalized response signal has a sufficient amplitude for reception purposes. Each time receivers 47 and 57 provide correlators 61 and 71, respectively, with a digital signal from a particular response unit, a logic signal is produced at the correlator 61 and 71 outputs corresponding to that particular response digital signal. For example, if the user of response unit 1 selects A as his answer, response unit 1 transmits the digitalized response signal corresponding to answer A. Such signal is received by one or both of receivers 47 and 57. If both receivers receive such signal, a logic signal is produced at logic outputs 61A and 71A. The output of OR gate 63A produces a logic high even if only one of receivers 47 and 57 received a digitalized response signal corresponding to answer A. Such high logic pulse is counted by counter 65A. It is readily seen that response processor 45 functions similarly in processing received digitalized response signals corresponding to suggested answers B through E. Response processor 45 thus counts the total number of each of the five types A through E of digitalized response signals received. Display 67 displays these counted totals.

To receive voice signals transmitted by response communicating units 1 through N, either on the frequency of digital response signal transmission or an alternate frequency, an audio output selector 73 is operatively coupled to outputs of receivers 47 and 57. Audio output selector 73 samples the amplitudes of the radio frequency signals received by receivers 47 and 57 and determines which signal has a greater amplitude. Selector 73 provides output to such signal. Such an audio receiving configuration is known as a "voting receiver". A public address amplifier 60 is coupled to the output of audio selector 73. Loudspeaker 70 is coupled to the output of public address amplifier 60.

Figure 6:
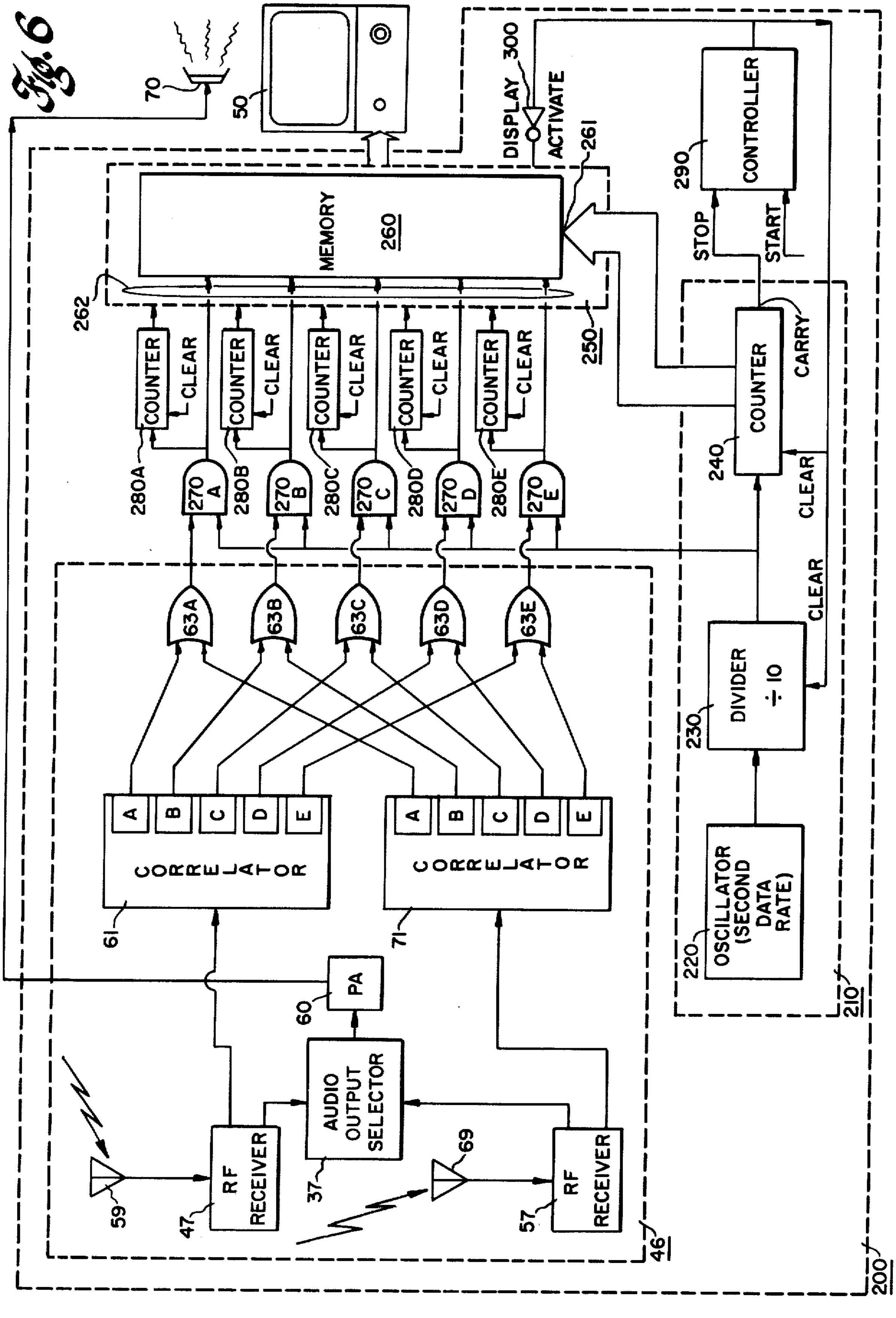
FIG. 6 is a detailed block diagram of another alternative response processing unit for such electronic voting system.

FIG. 6 shows another response processor 200 which may be employed as response processor 40 of electronic voting system 10. Response processor 200 includes a receiving portion preferably, although not necessarily, substantially identical to the space diversity reception receiving portion 46 shown in FIG. 5. Response processor 200 is shown in FIG. 6 including such a space diversity receiving portion 46 to avoid the problems of multipath reception of the digitalized response signals transmitted by response communicating units 1 through N.

Response processor 200 includes an address generating circuit 210 for generating a different address corresponding to each of the response time intervals during which a digitalized response signal is transmitted by one of response communicating units 1 through N. Address generator 210 includes an oscillator 220. Oscillator 220 produces an output signal of frequency equal to that of oscillator 110 of the response communicating unit. Oscillator 220 thus oscillates at the second data rate. A divide-by-ten divider 230 is coupled to the output of oscillator 220 such that one logic pulse is produced at the output of divider 230 for each of the time intervals during which the respective response unit 1 through N transmits. That is, one logic pulse is generated by divider 230 for every 10 bits of information transmitted by response units 1 through N. (In this particular embodiment, the response time interval is 10 bits long.) The output of divider 230 is coupled to the input of a 1024 bit counter 240. Counter 240 includes a clear terminal, a 10 bit output port and a carry terminal that produces a logic pulse when counter 240 has counted to its capacity.

Response processor 200 includes an electronic processor portion 250. Electronic processor 250 is programmed to receive and store information indicating how the voting proceeded. Processor 250 places such signal information in a desirable format for display on a display 50 operatively coupled thereto. More specifically, electronic processor 250 includes a first memory portion 260, typically comprised of a 5 by 1024 bit random access memory. Memory 260 includes a ten bit address input port 261 which is coupled to the 10 bit output port of counter 240. Memory 260 includes a five bit data input port comprising 262 five data input terminals.

Response processor 200 includes five two-input AND gates 270A, 270B, 270C, 270D and 270E. One input of each of AND gates 270A through 270E is coupled to the output of divider 230. The remaining inputs of AND gates 270A through 270E are respectively coupled to the outputs of OR gates 63A through 63E. The outputs of AND gates 270A through 270E are coupled to the data input port 262 of memory 260.

Response processor 200 as so far described functions as follows. Upon reception of a digitalized response signal corresponding to one of the suggested responses A through E, receiving portion 46 generates a logic pulse at the output of the particular OR gate 63A through 63E which corresponds to that suggested response. It should be noted that such reception occurs during the response time interval allotted to the particular response communicating unit which transmitted the digital response signal. Since the output of each of AND gates 270A through 270E is connected respectively to the five data input terminals of memory 260, a five bit code indicating the selected response (for example, 10000 for response A, 01000 for response B, etc.) is stored in a location in memory 260 at an address determined by the logic status of address input port 261. More specifically, the output of counter 240 determines at which address in memory 260 that the 5 bit code indicating the particular selected response will be located. It should be noted that the data output port of counter 240 increments by one at a rate equal to one tenth of the second data rate and thus provides a different address in memory 260 for each of the incoming digitalized selected suggested responses received by response processor 200.

Assume that all the voters have already been questioned and have registered their responses in their respective response communicating units 1 through N. The master of ceremonies activates synchronization transmitter 20 which signals response units 1 through N to begin transmitting the digitalized selected responses during the time intervals respectively corresponding to each response unit. Response unit 1 transmits a digitally coded signal corresponding to the particular response registered therein during a first time interval of predetermined duration. Receiving portion 46 of response processor 200 receives such digitally coded response signal and converts it to a logic signal which is provided to one of five inputs comprising input data port 262 of memory 260 according to which of the five suggested responses the voter using response unit 1 selected. Such first voter's response is recorded in memory 260 at the first address location determined by address generating portion 210. AND gates 270A through 270E selectively allow such logic signal pulses to respectively flow from the outputs of OR gates 63A through 63E to memory 260 only during the portion of the first time interval during which the eight bit coded response is transmitted and received. (Transmission and reception of the eight bit coded response occur approximately simultaneously). Thus, a degree of noise immunity is achieved because memory 260 is not allowed to receive logic signals while the first and last guard bits of each time interval occur.

After the first ten bit response time interval has transpired, the second ten bit time interval begins. After the first guard bit of the second time interval, the eight bit digital signal corresponding to the response selected by the voter with response unit 2 is transmitted by the response unit 2 followed by a second guard bit. Address portion 210 of response processor 200 increments by one to a second address corresponding to this second time interval. This second address is supplied to memory 260 which is thus readied to store the response of the response communicating unit 2. Receiving portion 46 receives the eight bit digitally coded response transmitted by response unit 2 and provides a logic signal corresponding to that particular response to memory 260 at the second address location. Following storage of such second response, the third response time interval begins. The response of the third voting person is received and stored in memory 260 in a manner similar to that described above. The process of response signal reception and storage continues through the fourth through Nth time intervals until all of response communicating units 1 through N have responded.

Response processor 200 includes a plurality of counters 280A, 280B, 280C 280D and 280E which have inputs operatively coupled to the outputs of AND gates 270A through 270E, respectively. The outputs of counters 280A through 280E are coupled to electronic processor 250. Each of counters 280A through 280E respectively correspond to a different one of the five suggested responses. During reception of the digital responses transmitted by response communicating units 1 through N, counters 280A through 280E respectively count the total number of each of the five types of suggested responses received by response processor 200. Although shown as discrete components in FIG. 6, counters 280A through 280E may in fact be included in electronic processor 250. That is, electronic processor 250 may be programmed to perform the function of counters 280A through 280E. In either case, the total number of votes attributed to each of the five types of suggested responses is stored in electronic processor 250 for later display.

Response processor 200 includes a processor controller 290 for instructing electronic processor 250 to provide display signals to display 50 which is operatively coupled to processor 250. Processor controller 290 establishes various initial circuit parameters to be later described. Processor controller 290 typically comprises a flip-flop circuit including start, stop and output terminals. The output of processor controller 290 is coupled via an inverter 300 to a display activation terminal of electronic processor 250. The carry terminal of counter 240 is coupled to the stop terminal of processor controller 290. The start terminal of processor controller 290 is coupled to start switch 30 (not shown in FIG. 6) of synchronization transmitter 20 shown in FIG. 2. The output of processor controller 290 is coupled to the clear terminals of divider 230, counters 280A through 280E and counter 240. Thus, when a master of ceremonies activates synchronization transmitter 20 via start switch 30, the output of processor controller 290 assumes an output voltage state which causes the aforementioned oscillators, dividers and counters to be set at appropriate initial zero values. Upon completion of voting, that is, upon occurrence of the Nth time interval, the carry terminal of counter 240 produces a logic voltage pulse which causes the output of processor controller 290 to change its voltage level state thus instructing electronic processor 250 to provide display signals, representative of the voter responses stored therein, to display 50.

If, for some reason, all of the votes were not received and processed by response processor 200, the voting process may be conducted again and the responses recorded in electronic processor 250 may be written over without difficulty. Alternatively, electronic processor 250 is conveniently programmed to store digital response information in the memory locations with addresses at which a digital response is not stored during the first time a particular vote is conducted.

The invention is not limited to the embodiment shown wherein five suggested responses are provided and the voters choose therefrom. Rather, alternative embodiments of the invention accommodate a greater or lesser number of suggested responses. Those skilled in the art will appreciate the ease of adapting the particular embodiments shown to accommodate various numbers of suggested answers. Such alternative embodiments are within the intended scope of the invention. Similarly, alternative embodiments of the electronic voting system may employ a greater or lesser number of bits to transmit the digitally coded responses than the eight bits conveniently used herein.

Figure 7:
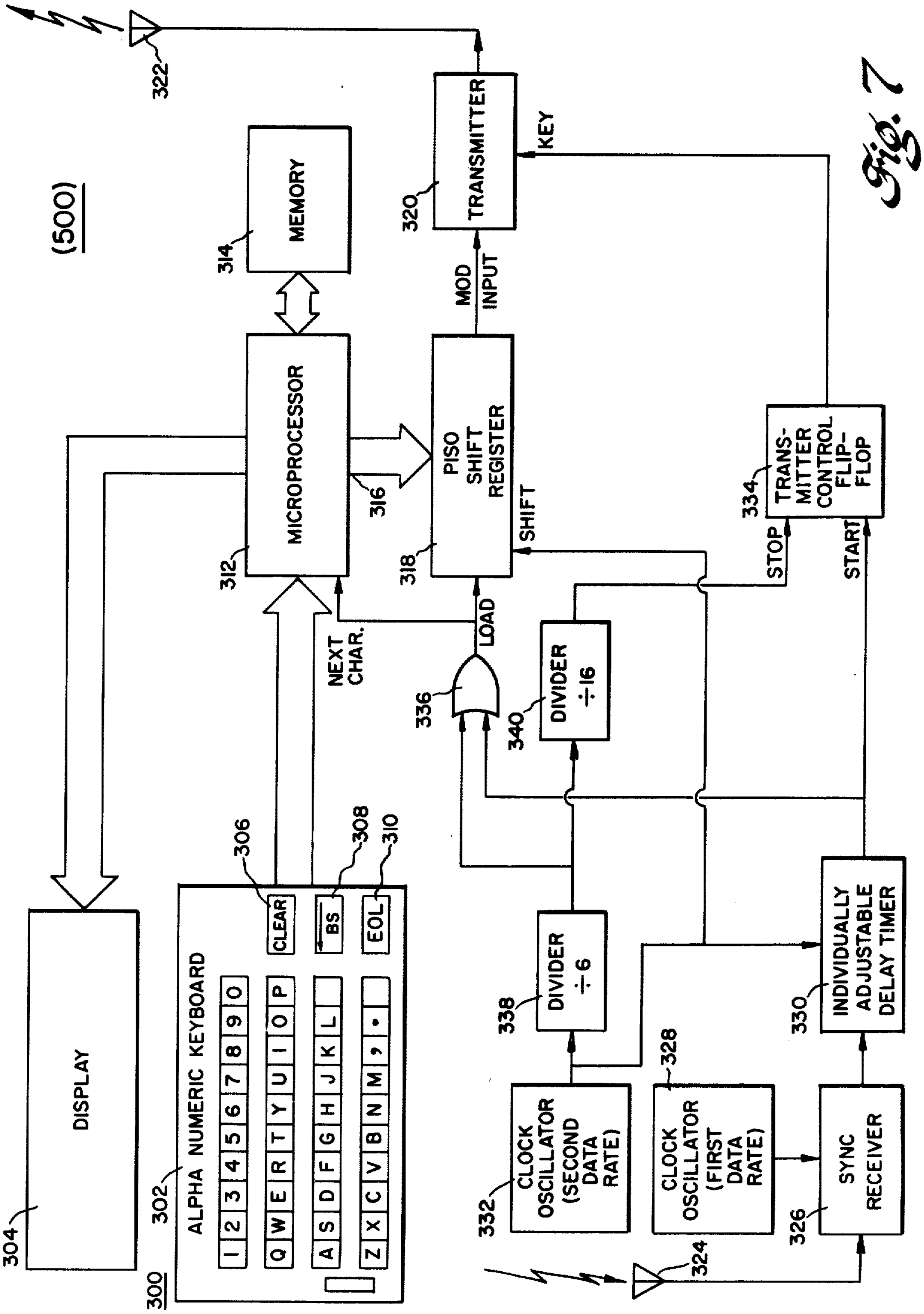
FIG. 7 is a detailed block diagram of a response communicating unit capable of transmitting multi-character digitally coded alphanumeric responses in another alternative preferred embodiment of the electronic voting system.
Figure 8:
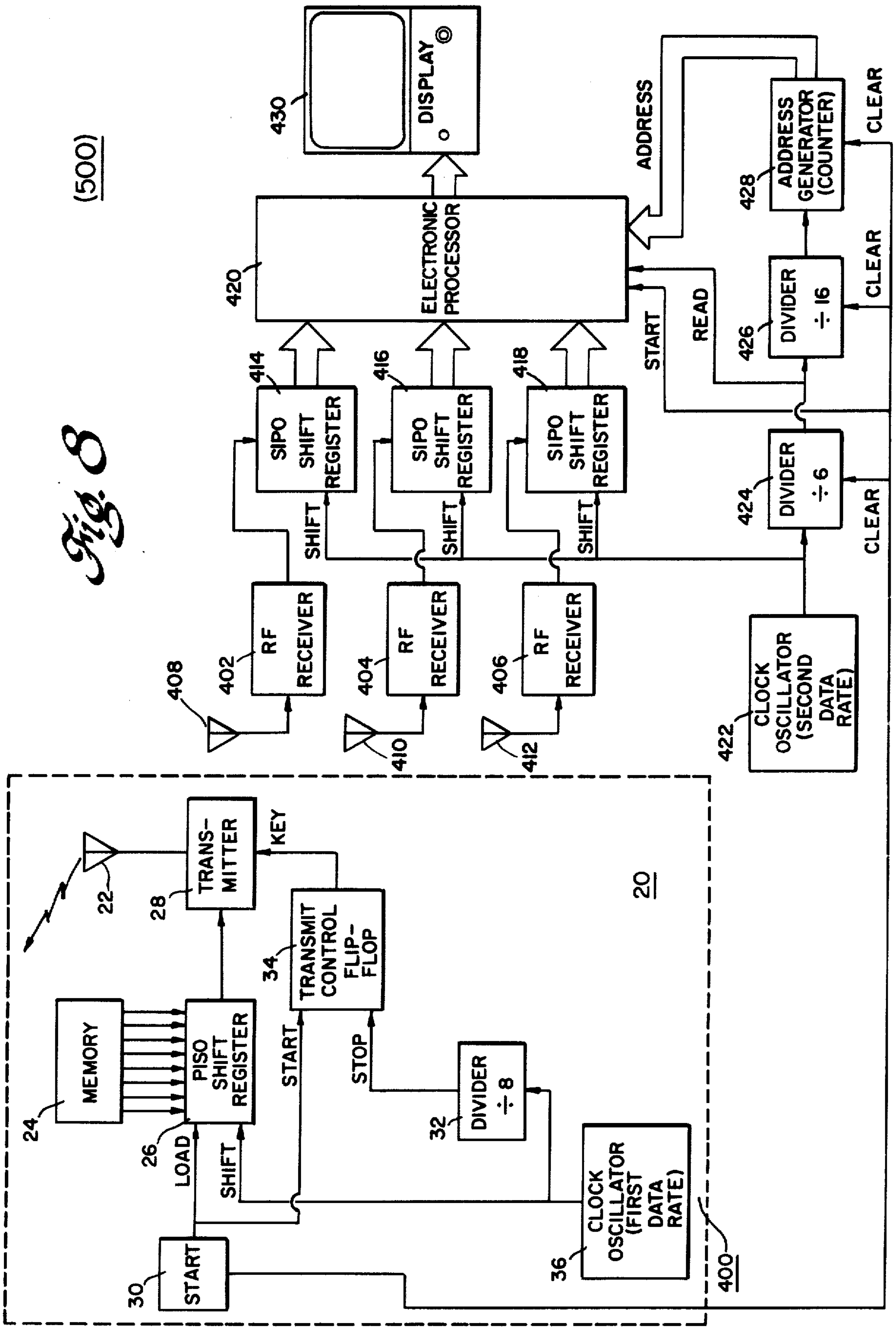
FIG. 8 is a detailed block diagram of an interrogating and response processing unit compatible with the alphanumeric response communicating unit of FIG. 7.

Another embodiment of the invention is shown in FIGS. 7 and 8 which respectively show a typical alphanumeric response communicating unit 300 and an interrogating-response processing unit 400 which together comprise an alphanumeric electronic voting system 500. Alphanumeric electronic voting system 500 is similar to electronic voting system 10 of FIG. 1 except that system 500 provides that each questioned person registers a multi-character alphanumeric response of his own composition on his respective response communicating unit. The response generated by the questioned person is conveniently limited to 16 characters although other embodiments of the invention may allow for responses of fewer or more characters. Electronic voting system 500 includes a plurality of response communicating units 1′, 2′, . . . N′, each of which is capable of transmitting digitally coded signals corresponding to the particular alphanumeric response registered in each respective unit. As before, the digital response transmitted by each alphanumeric response communicating unit is transmitted during a different time interval of predetermined duration. Because more information is involved in the transmission of multi-character alphanumeric responses than the single character suggested responses of electronic voting system 10, the duration of the time intervals employed in alphanumeric electronic voting system 500 are proportionately longer than those of electronic voting system 10 assuming the data rate and the bandwith of the response signals transmitted by the response communicating units remain constant.

FIG. 7 shows an alphanumeric response communicating unit 300 which may be employed as each of response communicating units 1′-N′. Response unit 300 includes an alphanumeric keyboard 302 into which the questioned person types his response. The output of keyborad 302 is coupled via a microprocessor 312 to a visual display 304 for displaying the typed response such that the questioned person may determine whether or not his response as typed is what he intended. Keyboard 302 typically includes a clear key 306, a backspace key 308, an end of line key 310 and other editing function keys such that the questioned person may correct or modify his typed response.

Microprocessor 312 is coupled to a random access memory 314. A different 6 bit digital pattern is stored in memory 314 for each of the alphanumeric characters on the keys of keyboard 302. When the questioned person types a response into keyboard 302, microprocessor 312 causes the six-bit patterns respectively corresponding to each of the characters so typed to be stored at selected addresses in memory 314 up to a maximum of 16 characters in this embodiment. These digital patterns corresponding to the questioned persons response thus stored in memory 314 are termed the "digitalized alphanumeric response". Microprocessor 312 includes an output data port 316 at which each of the 6 bit patterns comprising the "digitalized alphanumeric response" stored in memory 314 are provided output on a first-in-first-out basis. Output data port 316 is coupled to the input of a parallel-in-serial-out shift register 318. Shift register 318 includes load, shift and output terminals. The output terminal of shift register 318 is coupled to the modulation input of a radio frequency transmitter 320. Transmitter 320 includes a key terminal to enable it to be turned on and off by application of an appropriate signal thereto. Transmitter 320 may be amplitude modulated, frequency modulated or other suitable modulation type. Transmitter 320 transmits the bit patterns received on the modulation input thereof by modulating such bit patterns on an electromagnetic carrier wave of predetermined frequency. (The bit patterns comprising the "digitalized alphanumeric response" are transferred from microprocessor 312 to transmitter 320 in a manner to be discussed later). The output of transmitter 320 is coupled to antenna 322 of suitable size and dimensions to radiate radio signals at the predetermined frequency.

As in electronic voting system 10, the master of ceremonies causes a synchronization signal to be transmitted. Such synchronization signal is transmitted at a first data rate by the interrogating portion of interrogator-response processor 400 of FIG. 8. Such interrogating portion conveniently comprises the same synchronization transmitter 20 described above in the discussion of FIG. 2. Referring again to FIG. 7, the synchronization signal transmitted by synchronization transmitter 20 impinges on an antenna 324 which is coupled to the input of a synchronization signal receiver 326. (Antennas 322 and 324 may be conveniently combined into a single antenna by incorporating appropriate transmit-receive switching circuitry into response communicating unit 300 in a manner well known to those skilled in the art). Response communicating unit 300 includes a first clock oscillator 328 which oscillates at the first data rate. Clock oscillator 328 is operatively coupled to synchronization receiver 326 to allow synchronization receiver 326 to lock onto the synchronization signal transmitted at the first data rate. The output of synchronization signal receiver 326 is coupled to the input of an individually adjustable time delay circuit 330. Time delay 330 produces an output pulse after a selected amount of time has transpired from the time of reception of the synchronization signal by synchronization signal receiver 326. The amount of delay time provided by each of time delays 330 in response communicators 1'-N' from the time of synchronization signal reception until such output pulse is produced corresponds to the amount of time between the time of transmission of the synchronization signal and the beginning of the particular response time interval associated with each response communicating unit. Response communicating unit 300 includes a second clock oscillator 332 which oscillates at a second data rate. The output of clock oscillator 332 is coupled to time delay circuit 330. Time delay 330 is typically comprised of a programmable counter and thus clock oscillator 332 provides time delay circuit 330 with a counting time base. The output of time delay 330 is coupled to the start terminal of a transmitter control flip-flop 334. Transmitter control 334 includes start, stop and output terminals. The output terminal of transmitter control 334 is coupled to the key terminal of transmitter 320. When the start terminal of transmitter control 334 receives a pulse from time delay 330, the output terminal of transmitter control 334 changes voltage state, from a voltage low to a voltage high, for example, in such a manner as to turn on transmitter 320. Transmitter 320 is thus readied to transmit the bit patterns stored in memory portion 314.

Response communicating unit 300 includes a two input OR gate 336, the output thereof being coupled to the load terminal of shift register 318 and to processor 312. One input terminal of OR gate 336 is coupled to the output of time delay circuit 330. Thus, when time delay circuit 330 produces an output pulse at the beginning of the appropriate time interval corresponding to the particular response communicator 1'-N', the output of OR gate 336 produces a pulse which actuates shift register 318 causing the bit pattern of the first character of the "digitalized alphanumeric response" stored in memory portion 314 to be loaded into shift register 318. Such output pulse is provided to the Next Character terminal of processor 312 which is programmed to output the next successive character stored in memory 314 at output port 316. The output of clock oscillator 332 is coupled to the shift terminal of shift register 318 such that the bit pattern loaded into register 318 is serially shifted to the modulation input of transmitter 320 at the second data rate determined by the frequency of clock oscillator 332. The output of clock oscillator 332 is coupled to the input of a divide-by-six divider circuit 338. The output of divider circuit 338 is coupled to the remaining input terminal of OR gate 336. Thus, after the six bits of the first character stored in memory 314 have been loaded into register 318 and shifted out to transmitter 320, divider circuit 338 produces an output pulse which causes the output of OR gate 336 to produce a pulse which causes the six bit pattern corresponding to the second character stored in memory portion 314 to be loaded into shift register 318. As before, the contents of shift register 318 are shifted serially to the modulation input of transmitter 320 at the second data rate. Divider circuit 338 continues to produce appropriately timed output pulses causing the six bit patterns corresponding to the third, fourth . . . up to the sixteenth character stored in memory 314 to be loaded into shift register 318 and successively shifted to transmitter 320 for transmission thereby.

Response communicating unit 300 includes a divide-by-sixteen divider circuit 340, the input thereof being coupled to the output of divider 338. The output of divide circuit 340 is coupled to the stop terminal of transmitter control 334. Thus, after all of the six bit patterns corresponding to the sixteen characters of the "digitalized alphanumeric response" stored in memory portion 314 have been successively loaded into shift register 318 and shifted to and transmitted by transmitter 320, divider circuit 340 produces an output pulse which actuates transmitter control 334 in such a manner as to cause control 334 to change the voltage state of the output terminal thereof, thus turning off transmitter 320. That is, transmitter 320 is turned off after all sixteen characters of the respective questioned person's response have been transmitted. If the alphanumeric response conceived by a particular user is less than 16 characters long, processor 312 causes "fill characters" to be transmitted during the remaining portion of the respective response period allocated to the response communicating unit of such user. A "fill character" comprises a digital pattern of all zeroes having a number of bits equal to that of the alphanumeric characters.

Referring now to FIG. 8, the interrogating-response processing portion 400 of alphanumeric electronic voting system 500 is shown. Interrogating-response processing unit 400 typically includes three receivers 402, 404 and 406. The inputs of receivers 402, 404 and 406 are tuned to the radio frequency at which response communicators 1'-N' transmit and are respectively coupled to antennas 408, 410 and 412. In a manner similar to that described in the discussion of FIG. 5, antennas 408, 410 and 412 are positioned at different locations in relatively close proximity to response communicating units 1'-N' such that space-diversity reception is achieved and multi-path reception problems are substantially eliminated. A greater or lesser number of receivers than three may be employed in the electronic voting system; however, the greater the number of receivers used above one receiver, the lesser are the undesirable effects of multi-path signal reception. The outputs of receivers 402, 404 and 406 are respectively coupled to the inputs of shift registers 414, 416 and 418. Shift registers 414, 416 and 418 are typically comprised of six bit serial-in-parallel-out shift registers. Each of these shift registers includes shift and input terminals and an output port. The output ports of shift registers 414, 416 and 418 are coupled to the data input of an electronic processor 420.

Electronic processor 420 typically comprises a microprocessor although other types of electronic processors such as minicomputers, for example, may be employed as processor 420. Electronic processor 420 includes a memory portion (not shown) for storing the six bit patterns comprising the "digitalized alphanumeric responses" which are transmitted by response communicators 1'-N' and received by receivers 402, 404 and 406. To provide for the contingency that one of receivers 402, 404 and 406 fails to receive a particular six bit character or due to noise and/or other causes receives a false character representation, electronic processor 420 on a character-by-character basis compares the characters received by each of receivers 402, 404 and 406 and determines which character is received on a majority of the receivers. Electronic processor 420 is programmed to perceive such character as the correct character and appropriately stores such character in a location in the memory portion of processor 420 in a manner to be discussed later.

Interrogator-processor 400 includes a clock oscillator 422 which oscillates at a frequency equal to the second data rate, that is, the data rate at which the individual bits of the 6 bit patterns comprising the "digitalized alphanumeric response" are transmitted by response communicators 1'-N'. The output of clock oscillator 422 is coupled to each of the shift terminals of shift registers 414, 416 and 418. The start voting switch 30 of synchronization transmitter 20 is coupled to clock oscillator 422 such that oscillator 422 is actuated when switch 30 is actuated, that is, at the point in time when the synchronization signal is transmitted to response communicators 1'-N'. Thus, the individual bits of the six bit response patterns received by each of receivers 402, 404 and 406 are serially loaded into respective shift registers 414, 416 and 418 at the second data rate. The contents of shift registers 414, 416 and 418 are read into electronic processor 420 at one sixth the second data rate.

The output of clock oscillator 422 is coupled to the input of a divide-by-six divider circuit 424. Divider 424 includes a clear terminal which is coupled to start switch 30 of synchronization transmitter 20 such that divider 424 is cleared, that is, initialized at a zero value, when start voting switch 30 is actuated. Start switch 30 is coupled to the start terminal of electronic processor 420 such that processor 420 is supplied with data indicating the point in time when the synchronization signal is transmitted. The output of divider circuit 424 is coupled to the input of a divide-by-sixteen divider circuit 426 and to a read terminal of electronic processor 420. Divider circuit 426 includes a clear terminal which is coupled to start switch 30 of synchronization transmitter 20 such that divider circuit 426 is set at a zero initial value when start voting switch 30 is actuated. The output of divider circuit 426 is coupled to the input of an address generator 428, the output thereof being coupled to an address input of electronic processor 420. Address generator 428 is comprised typically of a counter circuit which starts counting at zero when start switch 30 is actuated and advances by one increment each time a complete "digitalized alphanumeric response" is received from one of response communicating units 1'-N'. Thus, a different address is provided in the memory portion of electronic processor 420 for each of the potentially sixteen character long responses. Memory locations are provided in the memory portion of electronic processor 420 corresponding to each of the addresses generated by address generator 428. Each of such memory locations is of sufficient dimension to hold up to sixteen of the six bit patterns comprising each "digitalized alphanumeric response". The functions of address generator 428 is conveniently incorporated in electronic processor 420 by programming processor 420 to appropriately generate addresses, thus eliminating the need for a separate address generator. A display 430 is coupled to a data output of electronic processor 420 such that data representative of the responses stored therein may be ascertained by an observer.

A brief summary of the circuit operation of the response processing portion of interrogator-response processor 400 follows. When start voting switch 30 is actuated by the master of ceremonies, a synchronization signal is transmitted by synchronization transmitter 20 to all of alphanumeric response communicating units 1'-N'. The up-to-sixteen character responses registered by the voting persons in response communicators 1'-N' are each transmitted during a different time interval as determined by the different delay times provided by adjustable time delay circuit 330 in response communicators 1'-N' shown in FIG. 7. Response communicating unit 1' transmits the response registered therein during the first time interval. This response is received by one or more of receivers 402, 404 and 406 and is shifted into a waiting memory location in electronic processor 420 at the second data rate. All of the bits of the response transmitted during the first time interval are stored at a first address in memory as determined by address generator 428. Divider circuit 424 divides the second data rate by six thus providing a pulse to the read terminal of electronic processor 420 each time one of the six bit patterns comprising one of the characters of the response is shifted into shift registers 414, 416 and 418 and thereby read into electronic processor 420. Thus, processor 420 is instructed to read the second six bit pattern of a response after reading the first six bit pattern of a response and so forth until all of the six bit patterns (that is, characters) of the first response are stored in the memory portion of electronic processor 420.

After response communicating unit 1' transmits the "digitalized alphanumeric response" registered therein during the first time interval, response communicating unit 2' commences transmission of the "digitalized alphanumeric response" registered therein during the second time interval. Address generator 428 generates a second address which is provided to the memory portion of electronic processor 420 thereby setting aside a separate memory location for the response transmitted during the second time interval. Such second response is received by receivers 402, 404 and 406 and shifted into the second memory location at the second address in a manner similar to that of the processing of the response of response communicator 1 as described above. The sequence of response transmission, reception and response storage in electronic processor 420 continues until all the responses from response communicating units 1'-N' have been stored in electronic processor 420.

Electronic processor 420 is programmed to provide appropriate formatting of the response information stored therein for display on electronic display 430. Thus, each response registered in electronic processor 420 and an identification of the corresponding response communicating unit making such response is conveniently displayed on display 430. These features allow alphanumeric electronic voting system 500 to find direct application in an environment such as the classroom situation. For example, a short answer or fill-in-the-blank type examination is administered by a teacher and the students respond via response communicating units 1'-N'. Each student's response is displayed for observation by the instructor on display 430.

A wireless microphone (not shown) is conveniently incorporated in alphanumeric response communicating units 1'-N' in a manner similar to its incorporation in response communicating units 1-N. In such embodiments, receivers 402, 404 and 406 are adapted to receive wireless voice transmissions. Thus, in a large classroom or auditorium environment, voice communication is provided between each of response communicating units 1'-N' and a teacher or other system operator stationed at interrogating-response processing unit 400.

It should be noted that a potential problem exists in alphanumeric electronic voting system 500 if the frequency on which synchronization transmitter 20 transmits is the same as the frequency on which response communicating units 1'-N' (typified by response communicating unit 300) transmit. If for some reason, one of response communicating units 1'-N' were to fail to receive the synchronization signal transmitted by synchronization transmitter 20, it would continue to look for the particular bit pattern of the synchronization signal among the bits of information being transmitted by the remaining response communicating units 1'-N'. It is possible that such response communicating unit may then receive a bit pattern among the digitally coded responses identical to the synchronization signal and falsely commence transmission of the response registered therein while another response communicating unit is transmitting its response. Response signal information could thus be lost.

To avoid this problem, response communicating units 1'-N' transmit on a different frequency than synchronization transmitter 20. Thus, even if one of response communicating units 1'-N' were to fail to receive the synchronization signal, the synchronization receiver 326 (shown in FIG. 7) of that particular response communicating unit is not tuned to the frequency on which the bit patterns of the alphanumeric responses are transmitted and thus is not falsely triggered thereby. Alternatively, alphanumeric electronic voting system 500 avoids this problem by causing communicating units 1'-N' to transmit the bits comprising the "digitalized alphanumeric responses" at a second data rate substantially greater than or substantially less than the first data rate at which synchronization transmitter 20 transmits the bits corresponding to the synchronization signal. The "digitalized alphanumeric response" so transmitted resultingly appears to be substantially different than the synchronization signal and thus the liklihood of confusion between the two is reduced. In such embodiment, response communicating units 1'-N' and synchronization transmitter 20 transmit on the same frequency and thus valuable frequency spectrum is conserved. In another alternative embodiment of the invention, the synchronization signal or word transmitted by synchronization signal transmitter 20 comprises a word having many more bits than the bits of the alphanumeric characters. Thus, since the synchronization word code has a substantially greater complexity than the digital code for the characters, the likelihood that one of response communicating units 1'-N' would be falsely triggered by interpreting the bit patterns transmitted by the other response communicating units as the synchronization word, is substantially reduced. Advantageously, in such embodiment, synchronization transmitter 20 and response communicating units 1'-N' transmit on the same frequency and thus frequency spectrum is conserved. Alternatively, the synchronization signal and "digitalized response signals" are transmitted via different modulation types to lessen the likelihood of confusion therebetween.

The invention is not limited to the particular embodiments shown wherein each response communicating unit 1'-N' transmits a response of up to 16 characters and wherein each character is 6 bit long. Rather, those skilled in the art will appreciate that the alphanumeric electronic voting system is easily adapted to accommodate a greater or lesser number of characters and a greater or somewhat smaller number of bits per character. Selection of the number of characters and the number of bits per character is determined by the amount of information it is desired for response communicating units 1'-N' to transmit and by the response time of the response communicating units 1'-N' which a user may deem acceptable. For a given data rate, the larger the number of characters and bits per character transmitted by response communicating units 1'-N', the greater the response time needed by the response communicating units to transmit all the responses and the greater the processing time required by electronic processor 420 to process all the responses. The first and second data rates may be greater or lesser than those discussed above, depending on the response and processing times desired and the amount of frequency spectrum consumption deemed acceptable. It is known that signals having large data rates consume more frequency spectrum than signals having smaller data rates.

The foregoing describes an electronic voting system including a plurality of response communicating units, each response communicating unit transmitting a selected response during a different time interval of predetermined duration. The response communicating units of the system are advantageously portable with no hard wire lines being required between the response communicating units and the central interrogating-response processing unit. The responses registered by persons using the response communicators are collectively determined with high accuracy.

While only certain preferred features of the invention have been shown by way of illustration, many modifications and changes will occur to those skilled in the art. It is, therefore, to be understood that the present claims are intended to cover all such modifications and changes as fall within the true spirit of the invention.

What is claimed is:

1. An electronic voting system for determining the selections of suggested responses made by each of a group of people to a given stimulus comprising:

a plurality of response communicating means for generating any one of a plurality of different digitally coded signals modulated on an electromagnetic carrier wave of predetermined frequency, each of said digitally coded signals corresponding to a different one of said suggested responses, each of said response communicating means being adapted to receive an electromagnetic synchronization signal and respectively transmit one of said plurality of digitally coded signals during a different one of a plurality of sequential time intervals of predetermined duration, each respective time interval commencing after a different selected amount of time has elapsed from the time of reception of said synchronization signal by each respective response communicating means;

synchronization signal transmitting means for transmitting said synchronization signal modulated on an electromagnetic carrier wave of predetermined frequency;

receiving means for receiving said digitally coded signals and including means for demodulating said digitally coded signals from said electromagnetic carrier wave;

correlating means, operatively coupled to said receiving means, for correlating said digitally coded signals and including a plurality of logic outputs, each logic output respectively corresponding to one of said plurality of digitally coded signals, each of said logic outputs respectively providing a logic signal each time one of said digitally coded signals is received which corresponds to that respective logic output; and a plurality of counting means for totalling the number of logic signals generated at each of said logic outputs, each counting means being respectively responsive to a separate one of said logic outputs.

2. The electronic voting system of claim 1 including electronic display means, operatively coupled to said counting means, for displaying data representative of the total number of logic signals counted by each of said counting means such that the number of each of said suggested responses by the audience may be ascertained.

3. The electronic voting system of claim 2 wherein each of said response communicating means includes synchronization signal detecting means for receiving and detecting said synchronization signal, said synchronization signal detecting means generating a logic signal upon reception of said synchronization signal.

4. The electronic voting system of claim 3 wherein each of said response communicating means includes timing means, operatively connected to said synchronization signal detecting means, for activating said response communicating means causing transmission of one of said plurality of digitally coded signals during the respective time interval corresponding to each response communicating means.

5. An electronic voting system for determining the selection of suggested responses made by each of a group of people to a given stimulus comprising:

a plurality of response communicating means for generating any one of a plurality of different digitally coded signals modulated on an electromagnetic carrier wave of predetermined frequency, each of said digitally coded signals corresponding to a different one of said suggested responses, each of said response communicating means being adapted to receive an electromagnetic synchronization signal and respectively transmit one of said plurality of digitally coded signals during a different one of a plurality of sequential time intervals of predetermined duration, each respective time interval commencing after a different selected amount of time has elapsed from the time of reception of said synchronization signal by each respective response communicating means;

synchronization signal transmitting means for transmitting said synchronization signal modulated on an electromagnetic carrier wave of predetermined frequency;

receiving means for receiving said digitally coded signals and including means for demodulating said digitally coded signals from said electromagnetic carrier wave;

correlating means, operatively coupled to said receiving means, for correlating said digitally coded signals and including a plurality of logic outputs, each logic output respectively corresponding to one of said plurality of digitally coded signals, each of said logic outputs respectively providing a logic signal each time one of said digitally coded signals is received which corresponds to that respective logic output;

electronic processing means responsive to said correlating means for providing display signals representative of the number of logic signals generated at each of said logic outputs, and electronic display means, operatively coupled to said electronic processing means, for displaying said display signals such that the responses of the audience may be ascertained.

6. The electronic voting system of claim 5 wherein each of said response communicating means includes synchronization signal detecting means for receiving and detecting said synchronization signal, and said synchronization signal detecting means generating a logic signal upon reception of said synchronization signal.

7. The electronic voting system of claim 6 wherein each of said response communicating means includes timing means, operatively connected to said synchronization signal detecting means, for activating said response communicating means causing transmission of one of said plurality of digitally coded signals during the respective time interval corresponding to each response communicating means.

8. The electronic voting system of claim 5 wherein said electronic processing means includes totalling means for generating display signals representative of the total number of logic signals generated at all of said logic outputs and the percentage of said total generated at each of said logic outputs.

9. The electronic voting system of claim 5 including address generating means, operatively coupled to said electronic processing means, for generating a plurality of digital addresses, each address corresponding to a different one of said time intervals, respectively.

10. The electronic voting system of claim 9 wherein said electronic processing means includes memory means for storing data representative of each of said logic signals in a respective memory location corresponding to each of said time intervals, each memory location having a respective address generated by said address generating means.

11. An electronic voting system for determining the multi-character alphanumeric responses individually conceived and made by each of a group of people to a single given stimulus simultaneously presented to all members of said group, comprising:

a plurality of response communicating means for generating digitally coded signals corresponding to said alphanumeric responses, each of said digitally coded signals being modulated on an electromagnetic carrier wave of first predetermined frequency, each of said response communicating means being adapted to receive an electromagnetic synchronization signal and respectively transmit said digitally coded signals during a different one of a plurality of sequential time intervals of predetermined duration, each respective time interval commencing after a different selected amount of time has elapsed from the time of reception of said synchronization signal by each respective response communicating means;

synchronization signal transmitting means for transmitting said synchronization signal modulated on an electromagnetic carrier wave of second predetermined frequency, said synchronization signal being transmitted at a first data rate;

receiving means for receiving said digitally coded signals and including means for demodulating said digitally coded signals from said electromagnetic carrier wave;

electronic processing means response to said receiving means for storing data representative of the digital signals received by said receiving means; and for providing display signals representative of the digital signals received by said receiving means;

address generating means responsive to said synchronization signal transmitting means and operatively coupled to said electronic processing means, for generating a plurality of different addresses, each address corresponding to a different one of said time intervals, respectively;

said electronic processing means including memory means for storing data representative of the digitally coded signals comprising each multi-character alphanumeric response in a different memory location for each of said responses, respectively, with each of said memory locations having a different one of said digital addresses, respectively; and electronic display means, operatively coupled to said electronic processing means, for displaying said display signals such that the responses made by the group of people may be ascertained.

12. The electronic voting system of claim 11 wherein each of said response communicating means includes synchronization signal detecting means for receiving and detecting said synchronization signal, said synchronization signal detecting means generating a logic signal upon reception of said synchronization signal.

13. The electronic voting system of claim 12 wherein each of said response communicating means includes timing means, operatively coupled to said synchronization signal detecting means, for activating said response communicating means causing transmission of said digitally coded signals during the respective time interval corresponding to each response communicating means.

14. The electronic voting system of claim 11 wherein said first predetermined frequency is different from said second predetermined frequency.

15. The electronic voting system of claim 11 wherein said response communicating means transmit said multi-character alphanumeric responses at a second data rate different from said first data rate.

16. The electronic voting system of claim 11 wherein said synchronization signal transmitting means employs a different modulation type than said response communicating means.

17. A method for voting to determine the collective response of an audience to a given stimulus with a plurality of suggested responses comprising:

presenting a stimulus with a plurality of suggested responses to said audience;

transmitting, from each member of said audience, an individually selected one of a plurality of different digitally coded signals modulated on an electromagnetic carrier wave of predetermined frequency, each of said digitally coded signals corresponding to a different one of said suggested responses, each digitally coded signal being transmitted during a different one of a plurality of sequential time intervals of predetermined duration, respectively;

receiving said digitally coded signals;

correlating the received digitally coded signals with the suggested responses represented thereby so as to generate a logic signal at one of a plurality of logic ports each time one of said digitally coded signals is received that corresponds to the suggested response represented by that respective logic port;

counting the number of logic signals generated at each of said logic ports, and displaying data representative of the number of logic signals generated which correspond to each of the suggested responses, such that the total number of each of said suggested responses by the audience may be ascertained.

18. The method of claim 17 including the step of transmitting a synchronization signal after presenting the stimulus to said audience, said synchronization signal causing commencement of transmission of said digitally coded signals.

19. The method of claim 17 including the step of electronically processing the counted number of logic signals generated at each of said logic ports, so as to generate display signals representative of the grand total number of logic signals generated at all of said logic ports and display signals representative of the percentage of said grand total of logic signals generated at each respective logic port.

* * * * *